United States Patent [19]

Sharpless et al.

[11] Patent Number: 4,469,452
[45] Date of Patent: Sep. 4, 1984

[54] INDICATOR SYSTEM AND MEANS FOR IRREVERSIBLY RECORDING A TEMPERATURE LIMIT

[75] Inventors: Edward N. Sharpless, Somerville; Joseph Lichtenstein, Colonia, both of N.J.

[73] Assignee: Whitman Medical Corporation, Clark, N.J.

[21] Appl. No.: 368,379

[22] Filed: Apr. 14, 1982

[51] Int. Cl.³ .................. C09K 3/34; G01N 21/06; G01N 31/22; C01K 3/00; C01K 11/16

[52] U.S. Cl. .................. 374/160; 116/206; 116/207; 116/216; 116/217; 116/219; 252/299.5; 252/229.7; 252/408.1; 252/962; 374/102; 374/106; 374/141; 374/161; 374/162; 436/2

[58] Field of Search .............. 374/102, 106, 141, 160, 374/161, 162; 252/299.5, 299.7, 408.1, 962; 116/206, 207, 216, 217, 219; 436/2

[56] References Cited

U.S. PATENT DOCUMENTS

| | | | |
|---|---|---|---|
| 2,216,127 | 10/1940 | McNaught | 374/106 |
| 2,261,473 | 11/1941 | Jennings | 374/106 |
| 2,716,065 | 8/1955 | Beckett et al. | 374/106 |
| 3,055,759 | 9/1962 | Busby et al. | 374/106 |
| 3,118,774 | 1/1964 | Davidson et al. | 374/106 |
| 3,409,404 | 11/1968 | Fergason | 252/299.7 |
| 3,529,156 | 9/1970 | Fergason et al. | 252/299.7 |
| 3,576,761 | 4/1971 | Davis | 252/299.7 |
| 3,665,770 | 5/1972 | Sagi et al. | 374/106 |
| 3,885,982 | 5/1975 | Fergason | 252/299.5 |
| 3,946,611 | 3/1976 | Larsson | 374/106 |
| 3,946,612 | 3/1976 | Sagi et al. | 374/106 |
| 3,974,317 | 8/1976 | Sharpless | 252/299.7 |
| 3,996,007 | 12/1976 | Fanc et al. | 116/206 |
| 4,042,336 | 8/1977 | Larsson | 374/106 |
| 4,066,567 | 1/1978 | Labes | 252/299.7 |
| 4,137,049 | 1/1979 | Couch et al. | 116/206 |
| 4,154,106 | 5/1979 | Inoue et al. | 374/106 |
| 4,232,552 | 11/1980 | Hof et al. | 374/106 |
| 4,285,697 | 8/1981 | Neary | 252/408.1 |
| 4,299,727 | 11/1981 | Hof et al. | 374/106 |

FOREIGN PATENT DOCUMENTS

| | | | |
|---|---|---|---|
| 595661 | 4/1978 | U.S.S.R. | 252/299.7 |
| 703560 | 12/1979 | U.S.S.R. | 252/299.7 |

OTHER PUBLICATIONS

"Use of Liquid Crystals as Vapor Detectors", Mol. Cryst. Liq. Cryst., vol. 27, E. J. Posiomek, et al.

Primary Examiner—Teddy S. Gron
Attorney, Agent, or Firm—Holman & Stern

[57] ABSTRACT

System and means for irreversibly recording the incidence of a predetermined temperature comprising a cholesteric liquid cyrstal system and an activator material capable of interacting with the liquid crystal system to induce a unique irreversible change in the optical properties thereof sustantially at the predetermined temperature. The system preferably includes means for separating the liquid crystal system and activator at temperatures below the activation temperature of the activator.

19 Claims, 9 Drawing Figures

U.S. Patent    Sep. 4, 1984    4,469,452
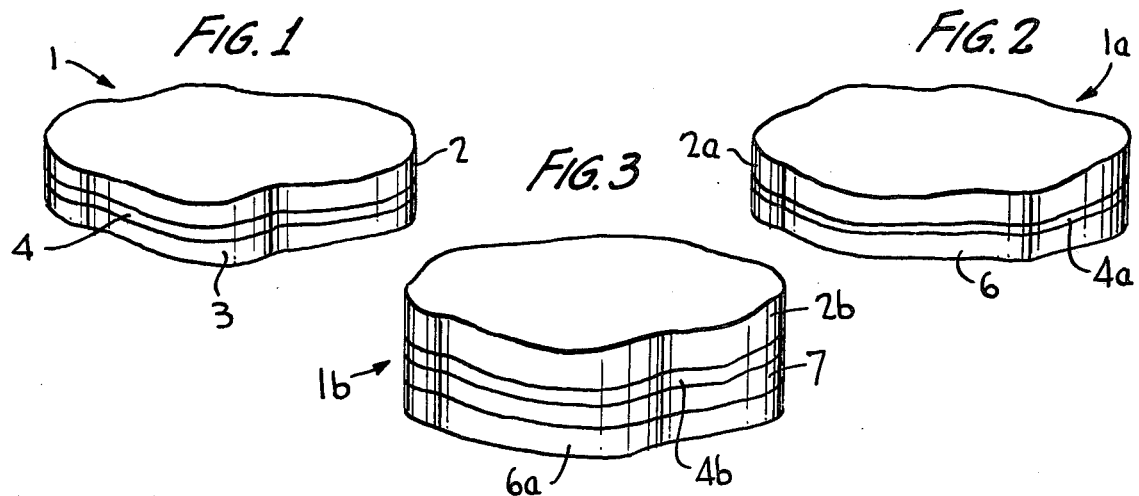
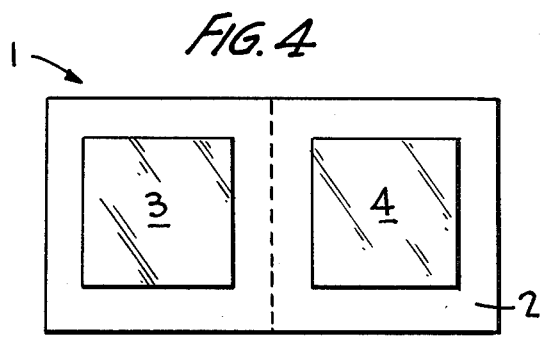
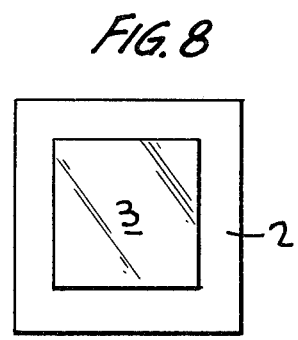
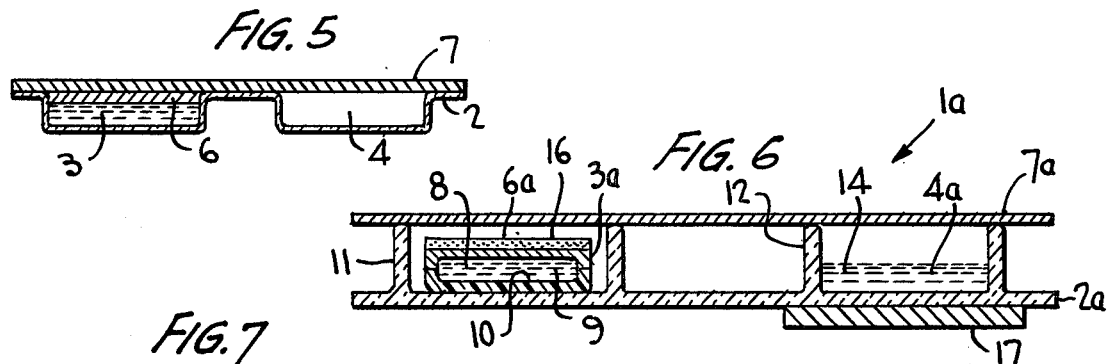
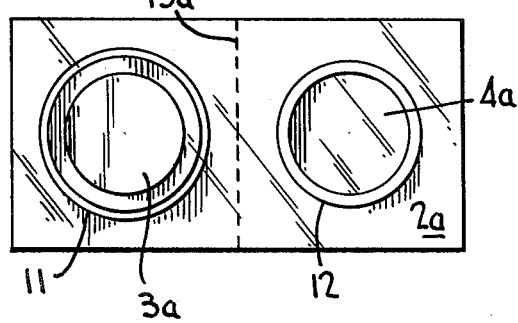
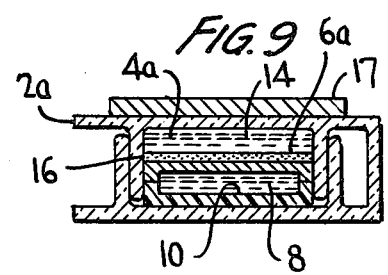

INDICATOR SYSTEM AND MEANS FOR IRREVERSIBLY RECORDING A TEMPERATURE LIMIT

BACKGROUND OF THE INVENTION

Cholesteric liquid crystalline indicator compositions are well-known in the art as optical indicators of transient environmental conditions. These compositions typically depend for their effect on a change in optical properties in response to a change in environmental conditions, such as a shift from color-exhibiting to colorless in response to a change in temperature.

Several difficulties have been encountered in the use of cholesteric substances as thermometric compositions, primarily owing to the rapid reversibility of the changes in optical properties. In many applications, it is highly desirable to have a permanent record that a predetermined temperature on other environmental condition has occurred, for example in the storage of food or sensitive biological materials. Many cholesteric substances, however, provide only fleeting records of fluctuating environmental conditions, rapidly changing color or gaining or losing color in response to stimulus. While methods have been devised to prolong these optical changes in some liquid crystal systems, the record of the occurrence of a predetermined condition generally is still too evanescent to be useful in applications where regular monitoring is not feasible.

It is accordingly an object of this invention to provide a method and means for irreversibly recording an environmental event.

It is another object of this invention to provide a method and means for making a permanent visual record of the occurrence of a predetermined temperature.

It is a further object of this invention to provide an indicator system for selectively indicating the occurrence of a predetermined temperature over a wide range of temperatures.

It is yet another object of this invention to provide a rapid and permanent indication of the occurrence of a predetermined temperature which is readily apparent to the naked eye.

It is also an object of this invention to provide a system and method for irreversibly recording the occurrence of a predetermined maximum temperature.

Other objects and advantages of the invention will be readily apparent to those skilled in the art.

BRIEF DESCRIPTION OF THE DRAWINGS

FIGS. 1-3 are alternate schematic embodiments of the indicator system of the invention;

FIG. 4 is a top view of one embodiment of the indicator means of the invention;

FIG. 5 is a side view of the indicator means of FIG. 4;

FIG. 6 is a side view of an alternate embodiment of the indicator means of FIG. 4;

FIG. 7 is a top view of the indicator means of FIG. 6;

FIG. 8 is a top view of the indicator means of FIG. 4 folded along the line 13; and FIG. 9 is a side view of the indicator means of FIG. 7, folded along the line 13a.

SUMMARY OF THE INVENTION

The invention provides an indicator system for irreversibly recording the incidence of a predetermined temperature comprising a cholesteric liquid crystal system and an activator material capable of interacting with the liquid crystal system to induce a unique irreversible change in the optical properties thereof substantially at the predetermined temperature. Preferred liquid crystal systems are those which display visible colors as a result of scattering impingent white light from the cholesteric substances and which irreversibly lose this property on interaction with the activator material, and become colorless; the loss of this property broadly coincides with the destruction of the liquid crystalline properties of the cholesteric phase by the activator material and irreversible transition of the cholesteric liquid crystal system into the true liquid or isotropic phase. The phase transition and consequent change in optical properties usually, but not always, occur at substantially the same temperature.

The temperature at which the activator is activated to interact with the liquid crystal system is referred to herein as the "activation temperature". The activator and liquid crystal system are selected for amounts and characteristics so that the activator is effectively intersoluble with the liquid crystal system substantially at the predetermined temperature; the term "effectively intersoluble" is defined to mean that (a) the activator is sufficiently soluble in the liquid crystal system at or near the activation temperature to rapidly interact therewith, and (b) interaction of the activator and liquid crystal system induces a unique irreversible change in the liquid crystal optical properties substantially at the predetermined temperature.

The invention further comprises a method for providing a permanent visual record of the incidence of a predetermined temperature wherein an activator material effectively intersoluble with a cholesteric liquid crystal system is combined with the cholesteric liquid crystal system so that the optical properties thereof are uniquely and irreversibly changed substantially at the predetermined temperature.

The activator comprises both reactive materials, which chemically combine with the liquid crystal material to alter its optical properties, and passive activator materials, which physically affect the molecular configuration of the liquid crystal system to alter its optical properties; while the passive activator materials generally need to be highly intersoluble with the liquid crystal system to effect the desired change in optical properties, the reactive activator materials usually need only to be partly soluble to achieve the same result. Activators are selected for the capacity of rapidly interacting with the liquid crystal system within the context of the indicator system at the activation temperature, while being inactive, or inactivatable, at other temperatures, usually temperatures below the activation temperature. Thus, a solid material having a melting point substantially coinciding with the activation temperature may be directly admixed with the liquid crystal system, or the indicator system may include barrier means for separating the activator material from the liquid crystal below the activation temperature of the activator. The activation temperature in this instance will be the temperature at which the activator permeates the barrier means to interact with the liquid crystal system, owing to a change in either physical or chemical characteristics of the activator at the activation temperature.

The invention further includes indicator means for permanently recording a predetermined temperature, usually a maximum temperature, comprising a cholesteric liquid crystal system, and an effectively intersoluble activator material. In a preferred embodiment, the indicator means further includes barrier means for separating the liquid crystal system from the activator material below a predetermined temperature. Suitable barrier means include films or membranes or similar materials which are impervious to both the liquid crystal system and the activator material under normal conditions, but which are sufficiently permeable to the activator at the predetermined temperature to permit interaction of the activator and the liquid crystal system to induce an irreversible change in the optical properties of the liquid crystal system.

Since, in the present invention, the visible response to the predetermined temperature, for example, a transition of the liquid crystal system from a color-exhibiting phase to a colorless phase, is dependent on the temperature at which the activator material becomes effectively intersoluble with the liquid crystal system, difficulties associated with the development of a finely-tuned liquid crystal system capable of a stable, accurate visual record of an environmental condition are eliminated. The invention is thus a distinct improvement over prior art techniques wherein changes in the optical properties of the liquid crystal systems are directly thermally-induced, and require careful monitoring for use in many applications.

DETAILED DESCRIPTION OF THE INVENTION

Cholesteric liquid crystals broadly useful in the practice of the invention comprise cholesteric substances such as those described in U.S. Pat. No. 3,576,761 to Davis, et al., issued Apr. 27, 1971. Briefly, these substances include cholesterol esters of alkanoic or aralkanoic acids, generally esters of alkanoic acids comprising higher fatty acids containing 9 to 22 C atoms and esters of lower saturated or unsaturated phenalkanoic acids having 1 to 3 C atoms; and cholesterol substituted by alkyl or aryl esters of carbonic acid, wherein the alkyl moiety contains from 1 to 22 C atoms. The alkyl moiety of the alkyl esters may be saturated or unsaturated, and may be unsubstituted or substituted with halogen or a conventional functional group. The phenyl moiety of the aryl ester group may be unsubstituted; or substituted with halo, alkyl, or alkoxy, particularly in the para position. Cholesterol derivatives comprising cholesterol substituted in the 3-position β-configuration) with halo-, particularly chloro- or bromo-, are especially useful. These and analogous cholesterol derivatives of a type well-known to those skilled in the art, are suitable for use in the present invention, provided that a unique change in the optical properties of the liquid crystal system can be induced by the activator material at the predetermined temperature.

As previously noted, exemplary cholesteric liquid crystal systems are those which exhibit color over a broad range of temperatures, and become colorless on changing to the isotropic phase. Particularly useful liquid crystal systems are those of the type which are essentially monochromatic over a wide temperature range, becoming colorless when the system loses its liquid crystalline properties. Such systems typically include at least two, and usually three or more, cholesteric liquid crystal compounds, with a cholesteryl halide as one component of the system. Systems which are both useful and practical are briefly exemplified as follows:

Cholesteryl Oleyl Carbonate, Cholesteryl Nonanoate, and Cholesteryl Chloride;

Cholesteryl Oleyl Carbonate, Cholesteryl Laurate, and Cholesteryl Chloride;

Cholesteryl Oleyl Carbonate, Cholesteryl 4-Butoxy phenyl Carbonate, Cholesteryl Chloride;

Cholesteryl Oleyl Carbonate, Cholesteryl Undecanoate, Cholesteryl Chloride;

Cholesteryl Oleyl Carbonate, Cholesteryl 10-Undecenoate, Cholesteryl Chloride; and Cholesteryl Oleate, Cholesteryl Nonanoate, and Cholesteryl Chloride.

Specific liquid crystal systems for use in the present invention include the following:

| System | Percent By Weight | Color Exhibited | Upper Limit Of Color-Exhibiting Range (approximate) |
|---|---|---|---|
| Cholesteryl Oleyl Carbonate | 69 | Green | 112° F. |
| Cholesteryl Chloride | 19 | | |
| Cholesteryl Nonanoate | 11 | | |
| Cholesteryl Oleyl Carbonate | 68 | Yellow Green | 114° F. |
| Cholesteryl Chloride | 21 | | |
| Cholesteryl Nonanoate | 11 | | |
| Cholesteryl Oleyl Carbonate | 58 | Yellow Green | 132° F. |
| Cholesteryl Chloride | 31 | | |
| Cholesteryl 4-n-Butoxy phenyl Carbonate | 11 | | |
| Cholesteryl Oleyl Carbonate | 52 | Red | 95° F. |
| Cholesteryl Chloride | 29 | | |
| Cholesteryl Nonanoate | 17 | | |

Other exemplary useful liquid crystal systems are described in U.S. Pat. No. 3,974,317 to Sharpless, issued Aug. 10, 1976. The liquid crystal systems may also include additives which affect their clearing point, as elaborated in the Sharpless patent. The systems may include other additives, for example, additives which increase the viscosity of the liquid crystal material to facilitate handling, such as cholesteryl 4-nonylphenyl-carbonate (NPC). Specific systems employing NPC are exemplified as follows:

| System | Percent By Weight | Color Exhibited | Upper Limit Of Color-Exhibiting Range (approximate) |
|---|---|---|---|
| Cholesteryl Oleyl Carbonate | 51 | Green | 114° F. |
| Cholesteryl Nonanoate | 16 | | |
| Cholesteryl Chloride | 24 | | |
| NPC | 9 | | |
| Cholesteryl Oleyl Carbonate | 54 | Violet | 96° F. |
| Cholesteryl Chloride | 17 | | |
| Cholesteryl Nonanoate | 9 | | |
| NPC | 20 | | |
| Cholesteryl Oleyl Carbonate | 52 | Royal Blue | 100° F. |
| Cholesteryl Chloride | 20 | | |
| Cholesteryl Nonanoate | 8 | | |
| NPC | 20 | | |
| Cholesteryl Oleyl Carbonate | 51 | Mid-Green | 101° F. |
| Cholesteryl Chloride | 22 | | |
| Cholesteryl Nonanoate | 8 | | |
| NPC | 19 | | |
| Cholesteryl Oleyl Carbonate | 47 | | 119° F. |

| System | Percent By Weight | Color Exhibited | Upper Limit Of Color-Exhibiting Range (approximate) |
|---|---|---|---|
| Cholesteryl Chloride | 32 | | |
| Cholesteryl 4-n-Butoxy phenyl Carbonate | 9 | | |
| NPC | 12 | | |

Advantageously, fumed alumina of the type available from Degussa Corporation, Pigments Division, Teterboro, N.J. (Aluminum oxide-C), may be added to the above formulations in an amount of about 1 to 5% by weight of the formulation, preferably about 2 to 3%, as a thickening agent.

Activator materials useful in the practice of the invention comprise materials which are effectively intersoluble with the liquid crystal system at the predetermined temperature. Suitable activators are those which have an activation temperature substantially coinciding with the predetermined temperature and which, upon reaching the activation temperature, rapidly dissolve in the liquid crystal system and irreversibly change its optical properties. The activators of the invention generally comprise solids having a melting point at or near the predetermined temperature which in the liquid state either chemically or physically interact with the liquid crystal system to cause a phase transition and an accompanying irreversible change in the optical properties at the predetermined temperature. While with some activators, the melting point and the activation temperature may be for practical purposes the same, with other activators the activation temperature may be slightly higher if, for example, the activator is highly viscous close to its melting point. The most desirable activators for many applications rapidly interact with the liquid crystal system at their activation temperatures, thus providing an accurate record of even the brief occurrence of the predetermined temperature. Activators which react more slowly may fail to record such a rapid fluctuation in temperature and should not be used in applications where such a record is needed.

The activators of the system may additionally comprise liquids or even gases effectively intersoluble with the liquid crystal system at the predetermined temperature. For such activators, and also solid activators, if desired, means are usually provided for preventing premature interaction between the activator and liquid crystal system. For example, the activation temperature of a liquid may be its vaporization point, in which case the liquid may be separated from the liquid crystal mixture by a gas-permeable film or membrane; similarly, a gas may be separated from the liquid crystal system by a film or membrane permeable at the activation temperature vapor pressure.

In typical practice, a liquid crystal system is selected which displays distinct optical properties over the contemplated operating temperature range, and which has a unique, irreversible change in optical properties when the liquid crystal properties of the system are destroyed. For example, a liquid crystal system which has the property of scattering impingent light (exhibits color) over a temperature range of from at least the lowest contemplated ambient temperature to at least above the predetermined temperature, and which also loses this property and becomes colorless in the isotropic phase is employed. While liquid crystalline materials which are monochromatic are preferred, polychromatic materials are also useful; the specific optical properties displayed under normal conditions are not especially important, so long as there is a distinct irreversible change in these optical properties on interaction with the activator at the critical temperature. It should also be noted that liquid crystal systems employable in the present invention characteristically lose their color at temperatures both above and below their color-exhibiting range. Thus, a crystal system which becomes colorless when interacted with activator at a predetermined maximum temperature may also be colorless at low temperatures. Since the latter change is quickly reversible, however, there is little possibility of confusion if a suitably broad color-exhibiting range is selected. An activator is selected which at the activation temperature is capable of inducing the unique, irreversible change in the optical properties of the liquid crystal system at the predetermined temperature, either by physical or chemical interaction with the liquid crystal system. Suitable passive activators include normal (unbranched) $C_{10}$–$C_{24}$ hydrocarbons, unsubstituted and end-substituted with alcohol, alkoxy, or amino groups, and mixtures thereof, particularly n-pentadecane, n-heptadecane, n-dodecane, n-tetradecane, n-dodecanol, oleylalcohol, n-hexadecane, and n-octadecane. Branched alkanes, and branched or unbranched alkenes, either substituted or unsubstituted are also suitable. Additional suitable passive activators include the clearing point depressants described in U.S. Pat. No. 3,974,317 and supra, and in U.S. Pat. No. 3,529,156 to Fergason, et al., issued Sept. 15, 1970. It is important in most applications that the activator material be of the highest possible purity to avoid inaccurate results. For passive activators normally in the solid state, a sharp melting point is most desirable to permit the activator to rapidly dissolve in the liquid crystal system. The presence of impurities may lower the activation temperature or otherwise affect interaction of the activator and the liquid crystal system. For this reason, hydrocarbons obtainable in high purity are generally preferred to fatty acids, esters, and alcohols. Even so, commercial hydrocarbon products of stated purity are not entirely reliable, and it is recommended that such products be tested for purity or otherwise calibrated for uniform results.

Exemplary passive activator materials and corresponding activation temperatures are set forth in Tables I and II:

TABLE I

| Activator | Activation Temperature (°C.) |
|---|---|
| n-Pentadecane | 10 |
| 1-Decanol | 11 |
| n-Heptadecane | 24 |
| 1-Dodecanol | 26 |
| Oleyl Alcohol | 7 |
| n-Octadecane | 29 |
| n-Tetracosane | 52 |

TABLE II

| Activation Temperature | Percent By Weight | |
| | n-Dodecanol | Oleyl Alcohol |
|---|---|---|
| 10° C. | 53 | 47 |
| 12 | 59 | 41 |
| 15.5 | 69 | 31 |
| 20 | 79 | 21 |
| 26 | 100 | 0 |

Exemplary reactive activators which chemically combine with the liquid crystal system to induce a unique, irreversible change in the optical properties thereof include amines such as triethylamine or pyridine capable of forming the quaternary hydrochloride salt with cholesteryl chloroformate. The inclusion of this acid chloride in the liquid crystal system in amounts under about 10% does not compromise the stability of the system, and produces the desired irreversible change. Broadly, many reactive activators which irreversibly affect the liquid crystal optical properties are known, and include halogens, oxidizing agents, alcohols, amines, acids, bases, and reducing agents. Both liquid and solid may be employed in conjunction with barrier films or membranes permeable to the activator at the activation temperature. Alternately, activator systems may be employed comprising one or more components which react at the activation temperature to form a material to which the barrier film or membrane is then permeable. Suitable materials are, for example, liquids which are non-reactive below the activation temperature, but which react at the activation temperature to form a gas effectively intersoluble with the liquid crystal system; such reactive systems are well-known in the art.

In the preferred practice of the invention, the indicator system of the invention includes a dye component disposed to provide a light-absorbing background for the liquid crystal system. The preferred liquid crystal systems of the invention have the property of selectively scattering impingent white light while transmitting part of the impingent light. Thus, a dark background such as red, blue, green, or brown for observing the liquid crystal is important in assessing its optical characteristics, as a dark background will adsorb the transmitted rays and permit observation of the scattered or reflected rays. The exact disposition of the dye component will depend on the indicator system employed.

In one embodiment, illustrated in FIG. 1, the indicator system, generally indicated at 1, includes a liquid crystal system 2 superposed on an activator 3 and separated therefrom by barrier means comprising a transparent or translucent film or membrane 4. The activator material includes a dye soluble therein, such as Morton Automate Red G distributed by Morton Chemicals Co., Chicago, Ill., in small amounts, for example 1 to 2 drops of dye per 10 to 15 g activator. At normal temperatures, the color play, for example green, of the liquid crystal will be observed against the red background, but on activation and loss of liquid crystalline properties the crystal system will become colorless, and the red dye will become observable. In an alternate embodiment illustrated in FIG. 2, the indicator system generally indicated at 1a includes a carrier for the activator, for example a porous pad 6 disposed beneath the liquid crystal system 2a, and separated therefrom by membrane 4a. In this instance, the pad is colored and saturated with undyed activator. On activation of the activator and destruction of the liquid crystalline properties of the liquid crystal system 2a the color of the pad is seen through the now-transparent liquid crystal system. In yet another embodiment, illustrated in FIG. 3, a second colored non-saturated pad 7 is used as a background pad for the liquid crystal system 2b and superposed on a first pad 6a saturated with activator. Membrane 4b separates the liquid crystal 2b from the combined first pad 6a and second pad 7. On activation, the activator flows through the pad 7, destroying the liquid crystalline properties of the liquid crystal and changing it from green to colorless. The color of the second pad 7 is now visible. In the embodiment of FIG. 3, the first pad 6a may include a dye such as black, while the second pad 7 is colored green to highlight the green of the liquid crystal system 2b. Upon activation, the activator will carry the black dye into the crystal system 2b, turning it black. A red liquid crystal system, a red second pad 7, and a first pad 6a dyed blue, or analogous systems are also appropriate. Also, in the embodiment of FIG. 3, the second pad 7 may be saturated with a dye soluble in the activated activator material, for example, by employing a dye in a carrier to saturate the pad 7 and evaporating the carrier. On activation, the activator leaves pad 6a, and traverses rod 7, carrying dye from pad 7 into the liquid crystal system 2b.

Suitable dyes for these applications are those which are soluble in the activator, for example, oil or hydrocarbon soluble, and which have no contaminants which would prematurely affect the liquid crystal system. Morton Chemicals Automate Black 1 and Green 1 are exemplary suitable dyes.

In a particular application, the indicator system of the invention includes indicator means for permanently recording a predetermined temperature, usually a maximum predetermined temperature. Two embodiments are illustrated in FIGS. 4-9.

With particular reference to FIGS. 4, 5, and 8, the indicator means generally illustrated at 1, includes supporting means for supporting a liquid crystal compartment and an activator compartment, comprising a holder 2 having liquid crystal well 3 and activator well 4. The holder 2 is suitably comprised of a semi-rigid transparent polymer film such as a semi-rigid polyvinyl chloride film to provide dimensional stability to the holder. As best seen in FIG. 5, the liquid crystal well 3 includes a cover membrane or film 6 impervious to the liquid crystal; the membrane 6 is also impervious to the activator at temperatures below the activation temperature of the activator, but pervious to the activator at the activation temperature. The indicator means 1 also preferably includes a cover sheet 7 of any conveniently removable material to protect the membrane 6 and retain the activator within the well 4, for example, a paper laminate such as SURLYN and paper removably adhered to the wells by a suitable adhesive. For use, the holder 2 is folded along the score line 13 to bring the liquid crystal system in well 3 into intimate contact with the activator in well 4, so that at the activation temperature, the activator will quickly permeate the film 6 and interact with the liquid crystal system.

In a particularly advantageous embodiment illustrated in FIGS. 6 and 7, the indicator means 1a include raised liquid crystal and activator wells 3a and 4a, respectively, supported on transparent, semi-rigid holder 2a. The liquid crystal system is preferably preformed as a liquid crystal disc 8 by applying a film of liquid crystal 9 thickened as previously described to a substrate 10 of a clear polymer such as oriented polypropylene and disposing a cover membrane or film 6a comparable to the film 6 of FIGS. 4 and 5 over the liquid crystal film; the edges of substrate 10 and film 6a are then sealed to contain the liquid crystal and form the disc 8, and the disc 8 is disposed in well 3a, preferably securing it to the holder 2a by a suitable transparent adhesive (not shown). The holder 2a also includes a wall 11 spaced from and concentric with the wall defining well 3a frictionally engageable with wall 12 defining well 4a when the holder 2a is folded along scored line 13a (FIG. 7). The indicator means 1a further includes a cover sheet 7a adhesively secured to walls 11 and 12 for protecting activator 14 in well 4a and liquid crystal disc 8 prior to use. If desired, the indicator means 1a further includes a porous pad 16, of a material such as SCOTTFELT 10-900 which is porous to the activator 14, disposed for interposition between the activator material 14 and the liquid crystal disc 8 when the holder 2a is folded, as shown in FIG. 9. Preferably, the porous pad 16 is of a color which provides a good background for the liquid crystal material 9. A similar porous pad may be used in well 4a as a carrier for the activator 14, which is advantageously mixed with a dye, as previously described. Desirably, means for adhering the indicator means 1a to the material to be monitored, such as a pressure sensitive adhesive strip 17 are secured to the holder 2a beneath activator well 4a. Either or both the adhesive strip 17 or the holder 2a may be permanently colored in a like color as the liquid crystal displays prior to activation, to provide a non-subjective color reference and enhanced visibility of the liquid crystal color change at activation temperature, leaving, of course, the portion of holder 2a over liquid crystal disc 8 clear for observation.

In a particular contemplated application, the indicator means 1 or 1a is employed for monitoring the temperature of human whole blood, especially during transportation from a blood bank to a patient for transfusion. The correct storage temperature for blood is between 1° C. and 6° C., and, if exposed to temperatures exceeding 10° C., the blood is no longer safe for transfusion. In this application, a liquid crystal system 9 exhibiting color at least above 10° C. is employed in conjunction with an activator 14 having an activation temperature such that the activator becomes effectively intersoluble with the liquid crystal at 10° C., causing it to lose color at this temperature. The indicator means 1a is adhered to the blood bag by means of adhesive strip 17, and prior to transfusion, the crystal system 9 is observed for color characteristics. If, for example, a green liquid crystal system is employed, the indicator means 1a is examined to determine if the system 9 is still green, indicating that the bag has not been exposed to temperatures in excess of 10° C., or if the system has become colorless, indicating that 10° C. has been exceeded.

A suitable liquid crystal system 9 for this application is of the following formulation:
Cholesteryl Oleyl Carbonate—50% by weight
Cholesteryl Chloride—24% by weight
Cholesteryl Nonanoate 16% by weight
Cholesteryl-4-Nonylphenyl Carbonate—8% by weight
Fumed Alumina—2% by weight This liquid crystal system exhibits a monochromatic midgreen color up to a temperature of about 30° C. In conjunction with this formulation, an admixture of n-pentadecane and n-hexadecane in a ratio of about 3:2 by weight, having an activation temperature of 10° C. to 11° C. is employed as activator 14. Preferably, a red dye soluble in the pentadecane activator 14 is also employed, so that if the liquid crystal system becomes colorless by interaction with the activator, the red dye becomes visible through the substrate 10, giving a "traffic signal" effect to the indicator means 1a.

In operation, a liquid crystal disc 8 and activator 14 adapted for the particular application are placed in wells 3a and 4a, respectively and covered with cover sheet 7a. For monitoring, the cover sheet 7a is removed, the holder 2a is folded along the line 13 frictionally interengaging wall 12 between wall 11 and the wall defining well 3a, and bringing activator 14 into intimate contact with pad 16, or disc 8, if the pad 16 is not employed. Any protective film is removed from the adhesive sheet 17, and the folded holder 2a is adhered to the item to be monitored. If the activation temperature is reached, activator 14, carrying an optional dye, will flow through pad 16 and membrane or film 16a into the liquid crystal system 9, bringing about a unique, irreversible change in the optical properties of the liquid crystal system visible through the substrate 10 and the associated portion of the holder 2a.

What is claimed is:

1. An indicator system for irreversibly recording the incidence of a predetermined temperature comprising a cholesteric liquid crystal system which exhibits a visible color in the cholesteric phase, an activator effectively intersoluble with the cholesteric liquid crystal system substantially at the predetermined temperature and barrier means for separating the liquid crystal system from the activator below said predetermined temperature so that the cholesteric liquid crystal system rapidly interacts with the activator when the activator permeates the barrier at or near the activation temperature thereof to cause an irreversible phase transition of the cholesteric liquid crystal system from the cholesteric phase to the isotropic phase and a coinciding irreversible change in the optical properties of the liquid crystal system from color-exhibiting to colorless substantially at the predetermined temperature.

2. The invention of claim 1, wherein said barrier means comprises a film or membrane permeable to the activator at its activation temperature.

3. The invention of claim 1, wherein the activator is a solid and the activation temperature is its melting point.

4. The invention of claim 1, wherein the activator is passive.

5. The invention of claim 1, wherein the activator is reactive with the liquid crystal system.

6. The invention of claim 2, wherein the activator is a mixture of two or more components which react at the activation temperature thereof to form a substance capable of permeating said film or membrane.

7. The invention of claim 2, wherein the activator is a liquid and the activation temperature is the temperature at which its vapor pressure is sufficiently high to cause the vapor to permeate the film or membrane.

8. The invention of claim 1, wherein the color exhibited is monochromatic.

9. The invention of claim 1, wherein the liquid crystal system comprises a cholesteryl halide and at least one other cholesterol derivative.

10. The invention of claim 2, wherein the activator is a substituted or unsubstituted $C_{10}$–$C_{24}$ hydrocarbon permeable through the film or membrane at or near the melting point thereof.

11. The invention of claim 1, wherein a dye is incorporated in the activator.

12. The invention of claim 1, wherein the indicator system is employed to monitor the temperature of stored blood.

13. The invention of claim 12, wherein the blood is human whole blood and the activator becomes effectively intersoluble with the liquid crystal system at about 10° C.

14. The invention of claims 13 wherein the liquid crystal system comprises a cholesteryl halide and at least one other cholesterol derivative.

15. The invention of claims 13 wherein the liquid crystal system comprises cholesteryl oleyl carbonate, cholesteryl chloride, cholesteryl nonanoate, cholesteryl-4-nonylphenyl-carbonate, and fumed alumina in amounts of about 50%, 24%, 16%, 8% and 2%, respectively, by weight of the total composition.

16. The invention of claims 13 wherein the activator comprises an admixture of n-pentadecane and n-hexadecane in a weight ratio of about 3:2.

17. The invention of claim 1, wherein the cholesteric liquid crystal system normally exhibits color at the predetermined temperature.

18. The invention of claim 1, wherein the predetermined temperature is a maximum temperature.

19. The invention of claim 18, wherein the liquid crystal system normally exhibits color over a temperature range from at least about the lowest contemplated ambient temperature to above the predetermined temperature.

* * * * *